Figure 1:
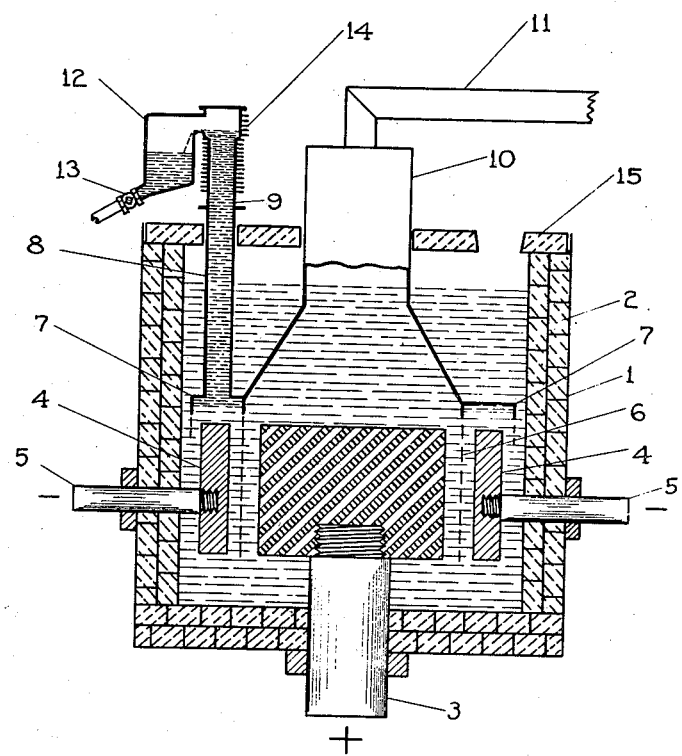

Sept. 20, 1938.　　　　R. E. HULSE　　　　2,130,801
PRODUCTION OF LIGHT METALS
Filed Oct. 4, 1934　　　2 Sheets-Sheet 1

INVENTOR.
Robert Edwin Hulse
BY
ATTORNEY.

Patented Sept. 20, 1938

2,130,801

UNITED STATES PATENT OFFICE 2,130,801

PRODUCTION OF LIGHT METALS

Robert Edwin Hulse, Niagara Falls, N. Y., assignor to E. I. du Pont de Nemours & Company, Wilmington, Del., a corporation of Delaware Application October 4, 1934, Serial No. 746,795

7 Claims. (Cl. 204—21)

This invention relates to the electrolytic production of light metals and more particularly to the production of a light metal by the electrolysis of a fused mixture of salts.

In the production of a light metal by the electrolysis of fused salts, the electrolytes used are commonly mixtures of two or more salts, the constituents thereof and their proportions being selected to obtain a mixture having a relatively low melting point. For example, in the production of sodium by the electrolysis of fused sodium chloride, the electrolyte commonly used consists of a mixture of sodium chloride and calcium chloride, which has a melting point considerably lower than that of pure sodium chloride.

When this mixture is electrolyzed, considerable quantities of calcium are liberated at the cathode together with the sodium. At the temperature of the electrolyte, the sodium is liquid and the calcium is soluble to a high degree in the liquid sodium. When the liquid crude sodium is removed from the electrolytic cell and cooled to a temperature near its melting point, e. g., to around 100° C., the calcium which is only very slightly soluble in liquid sodium at the lower temperatures precipitates. In order to produce substantially pure sodium which contains not more than traces of calcium, the sodium may be filtered at a temperature just slightly above its melting point. In such filtration operations, it is practically impossible to make a complete separation of the metals. Although by proper filtration procedure, substantially pure sodium may be obtained, the residue left in the filter contains, in addition to solid calcium, large amounts of liquid sodium and usually also large amounts of salts and oxides with which the crude metal may be contaminated at the time it is removed from the electrolytic cells or during its transfer from the cells to the filtration apparatus. As this method of sodium production has been carried out heretofore, the crude sodium leaving the electrolytic cells has contained appreciable quantities of calcium, for example, 3% or more, and as a result, considerable quantities of sodium remained with the calcium in the filter. Also, the sodium leaving the cell usually carried an appreciable quantity of the electrolyte suspended therein, which further increased the solids to be removed by filtration. In large scale operation, this led to large quantities of a mixture of sodium, calcium, oxide and salts known as "filter sludge". This filter sludge has no use in itself, is dangerous to store or handle because of its high reactivity with water or moisture of the air causing a fire hazard, and it is difficult to recover the metallic values from the sludge. Consequently, in commercial operation, it is desirable to produce as little of the filter sludge as possible. Although improved filtration methods may reduce the amount of sodium in the sludge to some extent, the best known methods of filtration still produce a filter sludge containing considerable quantities of sodium.

A further disadvantage of the presence of a foreign metal in a liquid light metal product from a fused salt electrolytic cell is that precipitation of the foreign metal often causes plugging of the pipes and other apparatus used for handling the liquid metal.

An object of this invention is to provide an improved method for the production of a light metal by the electrolysis of a fused mixture of salts of two or more metals, whereby one of the metallic products may be recovered from the electrolytic cell in a substantially pure state or free from large amounts of other metals which may be formed in the cell. Other objects will be apparent from the following description of my invention.

I have found that the above objects may be attained by upwardly flowing the combined liquid metallic product produced in a fused salt electrolytic cell away from the zone of the electrolysis towards the point of discharge from the cell, simultaneously cooling the upwardly flowing liquid metal to a temperature where undesirable metallic constituents will be precipitated and at the same time maintaining such rate of upward flow and other conditions at and below the point where the cooling is applied so as to permit the precipitated metallic constituents and suspended solids to settle out before the liquid metal is discharged from the cell. Preferably, the precipitated metal is caused to return into the electrolytic cell where it may react with the electrolyte.

Figure 2:
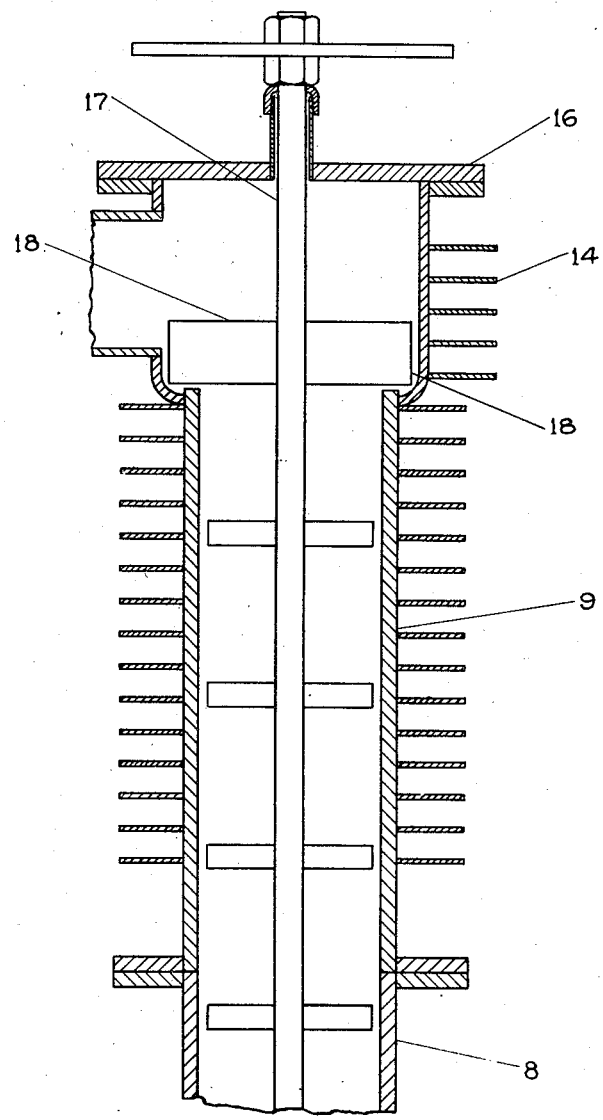

The drawings illustrate apparatus suitable for practicing my invention. Figure 1 is a vertical cross-section of a cell for electrolyzing fused salt mixtures of the type described in Downs U. S. P. 1,501,756; this type of cell is hereinafter referred to as the "Downs cell". Figure 2 is a vertical section of one element of a Downs cell which is adapted to be used in practicing my invention.

The electrolytic cell illustrated by Figure 1 consists of a cylindrical metal shell 1, lined with a refractory brick material 2. Within the cell is mounted a cylindrical graphite anode 3, which is surrounded by a cylindrical, annular steel cathode 4, the latter having connections 5, to the outside of the cell. The anode and cathode are separated by a foraminous metallic diaphragm 6. The diaphragm 6 is suspended from an annular structure 7, which is in the nature of a circular inverted trough, termed the "collector ring". The collector ring 7 is situated just above the cathode 4, and is adapted to collect the liquid light metal which is liberated at the cathode and rises through the electrolyte into the collector ring 7. The gas collecting dome 10, situated above the anode and supported by the collector ring 7 in the center of the cell, serves to collect gas rising from the anode 3. The gas collected in the dome is led from the cell by pipe 11. The collector ring and dome assembly is supported in the cell by suitable means not shown. At one point, a vertical conduit 8, 9 rises from the collector ring 7. The upper end of conduit 8, 9 is connected to a receiver 12, which has an orifice at the bottom closed by stop-cock 13. The upper section 9 of the conduit 8, 9 is provided with plurality of horizontal metallic fins 14, which are welded to the surface of the conduit.

Figure 2 shows in detail the upper portion of the conduit 8, 9 equipped with the horizontal fins 14. The upper pipe section 9 is provided with a cover 16, through which depends an agitating device which consists of a vertical rod 17, which is equipped with a plurality of blade members 18, extending radially at various points along the length of the rod 17.

I do not claim herein the novel apparatus described at this is claimed in the co-pending application filed of even date herewith by R. L. Hardy and myself, entitled Apparatus for production of light metals, Serial Number 746,796.

One method of practicing my invention will be described with reference to the apparatus illustrated in Figure 1. When this cell is operated with a mixture of sodium chloride and calcium chloride as the electrolyte, chlorine is liberated at the anode and rises into the collector dome 10 and thence passes out through pipe 11. At the cathode, both sodium and calcium are liberated, forming a liquid alloy of the two metals which, being lighter than the molten salt electrolyte, rises upwardly and into collector ring 7. From collector ring 7, the liquid metal rises upward into the conduit 8, 9 to a height above the surface of the electrolyte which is determined by their respective specific gravities. The receiving vessel 12, is located at a height just below the maximum level to which the liquid metal will rise in the conduit so that the metal flows from the upper section of the conduit into the receiver. For a given rate of electrolysis, under proper operating conditions, there will be a certain fairly constant rate of flow of metal from the collector ring. In accordance with my invention, the upper section 9 of the conduit is provided with a suitable cooling device, for example the welded fins 14, which offer a large radiation surface and thereby cool the pipe section 9. In addition to this, the inside diameter of the pipe sections 8 and 9 is made sufficiently large to cause a relatively slow rate of flow of liquid metal therethrough.

Thus, by regulating the diameter of the conduit relative to the flow of metal from the collector ring, the linear upward rate of flow of the liquid metal is sufficiently slow to allow precipitated material to settle back into the collector ring 7. The degree of cooling applied to the upper pipe section 9, may be such that the temperature of the liquid metal therein will be sufficiently low to cause the desired quantities of foreign metal to precipitate out. In the production of sodium from a fused bath of calcium and sodium chlorides, I may maintain the temperature at the outlet end of the conduit 8, 9 at between 100 and 250° C., preferably at not more than 200° C., the temperature of the fused salt bath being about 600° C. By this method of operation under conditions of large scale commercial production, the sodium entering the receiver will not contain more than about 0.2% of calcium and usually less than this quantity, depending upon the degree of cooling applied. Because of the slow upward flow of the metal, the calcium which is precipitated out by the cooling action settles back into the cell by way of collector ring 7, where it reacts with the fused salt bath, according to the following formulae:

$$Ca + 2NaCl \rightarrow 2Na + CaCl_2$$

When the amount of calcium precipitated in the outlet conduit is relatively great, there is some tendency for the calcium to stick to the side walls of the outlet tube and when this occurs, crystal formation on these deposits of calcium may eventually cause plugging of the tube. In order to prevent this, I prefer to equip the outlet tube with an agitating device, for example, such as that shown in Figure 2. The purpose of this agitating device is to scrape off precipitated metal which may adhere to the side walls of the conduit and to break up any deposits of precipitated metal which may tend to plug the conduit. If the agitator is to be operated in a continuous manner, it should be operated at a slow rate of speed, in order not to interfere with the settling of precipitated material. I prefer to operate the agitating device only intermittently, for example, every half-hour or at other suitable periods of time, depending upon the conditions under which the particular electrolytic cell is operating. The agitator may be operated by giving it a rotational motion or a vertical reciprocal motion or both, as desired.

The following example illustrates the effectiveness of my invention:

*Example*

A Downs type electrolytic cell similar to that illustrated by Figure 1 of the appended drawings, was operated to electrolyze a mixture of sodium chloride and calcium chloride to produce sodium. The cell was modified by increasing the diameter of the conduit leading from the collector ring to the receiver to increase the cross-sectional area of the conduit by about five times. The upper section of the conduit was cooled by means of fins welded thereto. During the operation of this cell over an extended period of time, various arrangements of the cooling surfaces or radiating surfaces on the upper section of the outlet pipe were used, thus resulting in various temperatures in the upper portion of the conduit. The temperature of the out-flowing metal was measured at a point close to where it over-flowed into the receiver. The amount of calcium in the sodium passing into the receiver was periodically determined by analysis and the average values obtained. The following table shows the data obtained:

| Temperature of liquid metal | Percent calcium |
|---|---|
| 210°C | 0.21 |
| 170°C | 0.20 |
| 160°C | 0.20 |
| 135°C | 0.15 |

In the ordinary Downs type of electrolytic cell for the manufacture of sodium, the per cent of calcium in the discharged metal averages 3.0% or higher.

My invention is not restricted to the description and illustrative example given above, as various modifications may be made without departing from the spirit and scope thereof. The essence of my invention is that the upward flow of liquid metal is maintained at a rate sufficiently slow to allow precipitated and suspended material to drop back into the cell and suitable cooling be applied to cause the precipitation of undesired metallic constituents in the upwardly flowing liquid metal. Likewise, my invention is not restricted to any particular method of cooling the outflowing metal; this may be accomplished by any known means.

An advantage of my invention is that it provides a means of removing undesired metal or metals from the metallic electrolysis product within the confines of the electrolytic cell, thus resulting in a product which requires little or no further purification treatment after its discharge from the cell. A further advantage is that it greatly reduces loss and waste of the metallic product and simplifies the purification treatment of the product. When it is desired to produce a highly purified metallic product by filtration of the crude product, the small amount of filterable impurities in the crude product produced by my invention results in correspondingly small amounts of filter residue and hence in small amounts of the product entrained in the residue. Also, the small amount of filterable impurities greatly simplifies the filtration procedure and increases the capacity of the filtration apparatus to a marked extent. A still further advantage is that my invention simplifies the maintenance of constant electrolyte composition. For example, in the production of sodium by electrolysis of a sodium chloride-calcium chloride mixture, the calcium chloride content must be maintained within a certain range to keep the melting point of the electrolyte fairly constant. In practice, anhydrous calcium chloride is added to the bath periodically to replace that lost by electrolysis. It is desirable to reduce the amount of calcium to be added to the cell as much as possible, because an expensive process is necessary to produce the anhydrous grade of calcium chloride required. By the use of my invention, the amount of metallic calcium removed from the cell is very small, since most of the calcium precipitated from the out-flowing metal is returned to the electrolyte, with substantially no contamination by air or moisture and reacts with the electrolyte to produce calcium chloride. A still further advantage of my invention is that it greatly reduces the amount of electrolyte which may be carried out of the cell with the metallic product. My herein described method of removing the liquid metal permits the bulk of suspended salt to settle back into the cell; thus, I have been able to reduce the amount of salt in out-flowing metal to about one-tenth of the lowest values obtainable with prior methods.

I claim:

1. In the recovery of a light metal from a molten mixture of said metal and another heavier, higher melting metal ascending from an electrolysis zone where said mixture is being produced from a salt mixture, the step of cooling said ascending mixture to cause precipitation of at least the major portion of said higher melting metal.

2. In the recovery of sodium from a molten mixture of sodium and another heavier, higher melting metal ascending from an electrolysis zone where said mixture is being produced from a salt mixture, the steps of cooling said ascending mixture to cause precipitation of said other metal and causing the said ascending mixture to flow at such rate that the precipitated heavier metal will descend counter to the flow of the ascending mixture.

3. In the recovery of sodium from a molten mixture of sodium and calcium ascending from an electrolysis zone where said mixture is being produced, the steps of cooling said ascending mixture to cause precipitation of calcium and causing the said ascending mixture to flow at such rate that the precipitated calcium will descend counter to the flow of the ascending mixture.

4. A process for electrolyzing a fused mixture of salts, whereby a mixture of liquid light metals having a specific gravity lower than that of said fused salt mixture is liberated at the cathode, which comprises flowing the said liquid metal mixture from the cathode in an upward direction to a point outside the cell at a lineal velocity sufficiently low to permit precipitated matter to descend to the fused electrolyte, cooling the upwardly flowing metal mixture to precipitate a metallic constituent thereof and removing from the cell liquid metal substantially free from the precipitated constituent portion and causing the said precipitated constituent to contact with the fused electrolyte.

5. A process comprising electrolyzing a fused mixture comprising salts of sodium and calcium to produce at the cathode a solution of calcium in liquid sodium, cooling said solution within the confines of the electrolytic cell to a temperature of 100 to 200° C. to precipitate calcium, removing the precipitated calcium from the liquid metal within the confines of said cell, contacting said precipitated calcium with the fused electrolyte and removing the remaining liquid metal from said cell.

6. A process for manufacturing alkali metal which comprises electrolyzing a fused mixture comprising an alkali metal salt and the salt of another metal to produce liquid alkali metal containing said other metal dissolved therein, flowing said liquid metal substantially upwardly from its point of formation towards a point of discharge from the electrolytic cell at a rate of flow so adjusted that precipitated material will descend counter to the flow of metal and cooling the upwardly flowing alkali metal to precipitate out said other metal dissolved therein.

7. A process for electrolyzing a fused mixture of salts whereby a mixture of liquid light metals having a specific gravity lower than that of said salt mixture is liberated from the cathode, comprising flowing the said liquid metal mixture from the cathode in an upward direction to a point outside the cell at a lineal velocity sufficiently low to permit at least a major portion of precipitated matter to fall back downwardly to a zone where said precipitated matter will be redissolved and cooling said liquid metal mixture to such a temperature that substantially all undesired constituents of higher melting point are precipitated therefrom.

ROBERT EDWIN HULSE.